United States Patent

Moriya

Patent Number: 5,897,221
Date of Patent: Apr. 27, 1999

[54] LENS-FITTED PHOTO FILM UNIT

[75] Inventor: Mitsuhiro Moriya, Kanagawa, Japan

[73] Assignee: Fuji Photo Film Co., Ltd., Kanagawa, Japan

[21] Appl. No.: 08/978,427

[22] Filed: Nov. 25, 1997

[30] Foreign Application Priority Data

Nov. 27, 1996 [JP] Japan .................................. 8-316465

[51] Int. Cl.⁶ .................................................. G03B 17/24
[52] U.S. Cl. .............................................. 396/6; 396/538
[58] Field of Search ..................................... 396/6, 538

[56] References Cited

U.S. PATENT DOCUMENTS 5,737,659  4/1998  Stiehler et al. ...................... 396/538

Primary Examiner—David M. Gray
Attorney, Agent, or Firm—Young & Thompson

[57] ABSTRACT

A lens-fitted photo film unit is pre-loaded with unexposed photo film for taking an exposure thereon. A photo film roll chamber contains a roll of the unexposed photo film. A cassette containing chamber contains a cassette shell. The photo film is wound into the cassette shell after being exposed. A bottom opening is formed in a bottom of the cassette containing chamber. A bottom lid closes the bottom opening light-tightly, and is opened outwards after the photo film is wound into the cassette shell, to remove the cassette shell from the cassette containing chamber. An ejector projection is moved in response to outward opening movement of the bottom lid, and pushes the cassette shell toward an outside of the bottom opening, to move at least a bottom end face of the cassette shell out of the cassette containing chamber.

7 Claims, 4 Drawing Sheets

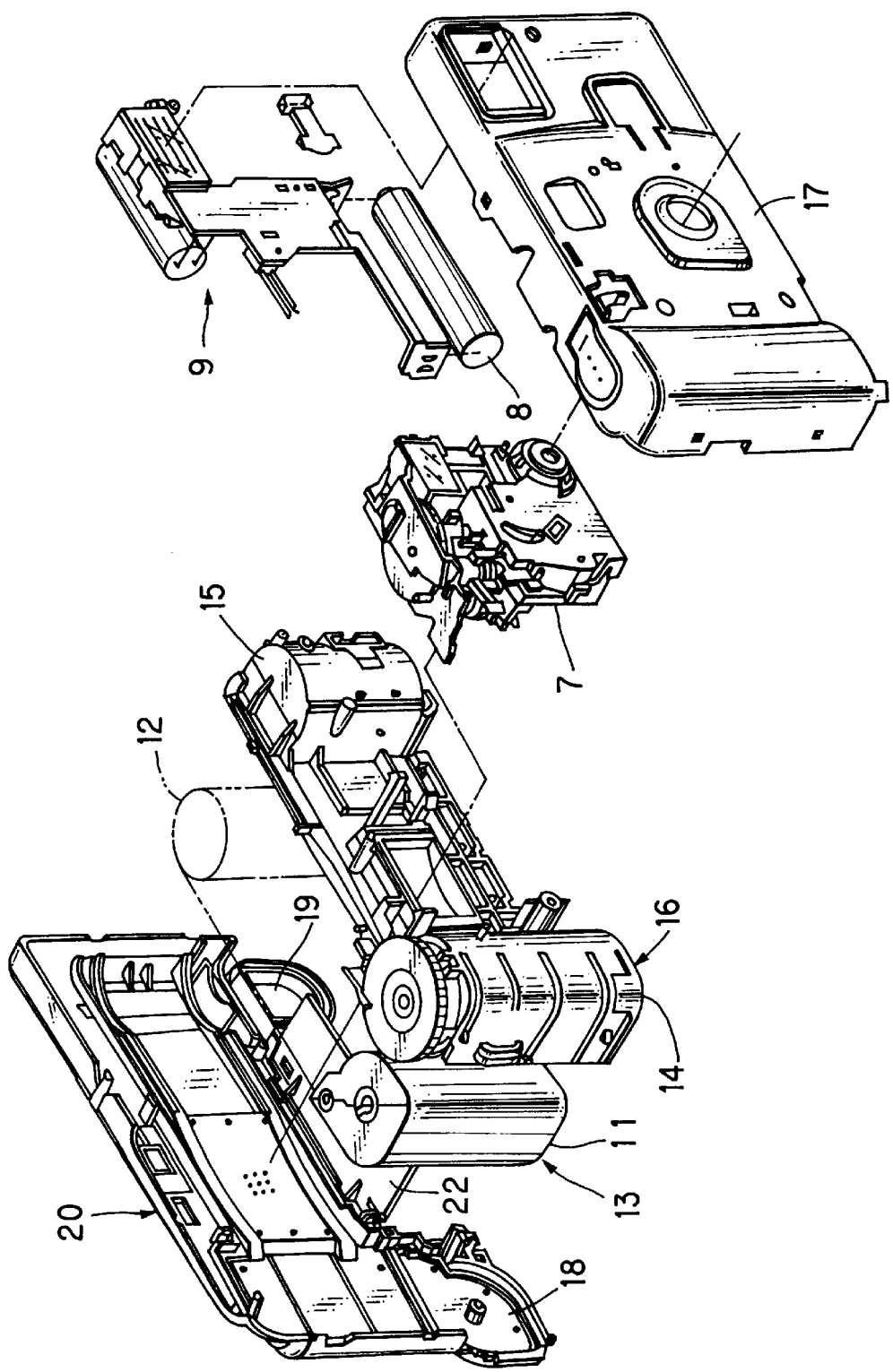

F I G. 4
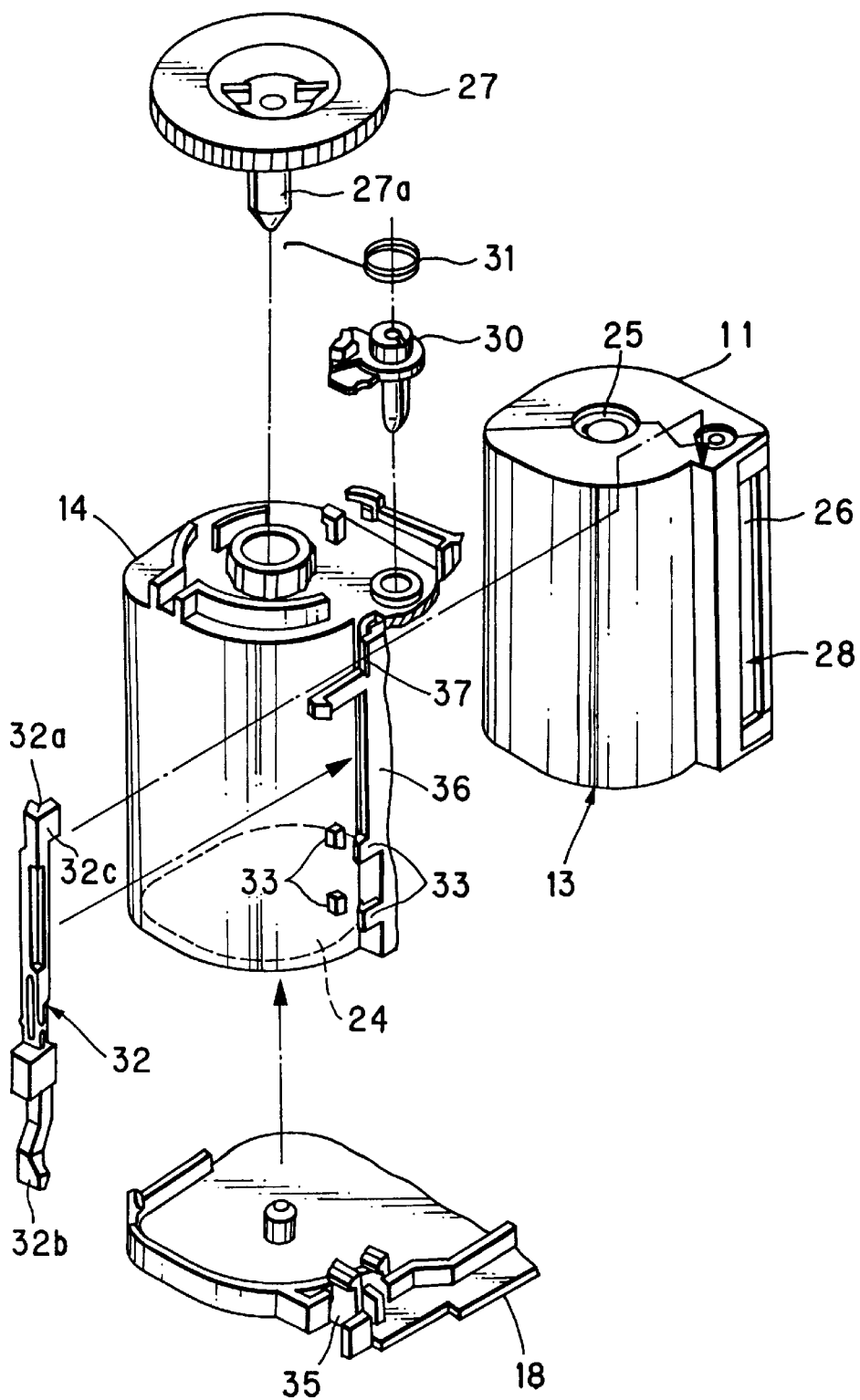

LENS-FITTED PHOTO FILM UNIT

BACKGROUND OF THE INVENTION

1. Field of the Invention

The present invention relates to a lens-fitted photo film unit. More particularly, the present invention relates to a lens-fitted photo film unit from which a photo film cassette can be safely removed after taking exposures.

2. Description Related to the Prior Art

There is a lens-fitted photo film unit including a simply constructed exposure-taking mechanism and pre-loaded with a photo film cassette, which contains photo film of the 135 type. The lens-fitted photo film unit has a cassette containing chamber and a photo film roll chamber. The cassette containing chamber contains a cassette shell of the photo film cassette. The photo film roll chamber contains a roll form into which the photo film is externally wound after being drawn from the cassette shell. The lens-fitted photo film unit is characteristically easy to handle and convenient even for amateurs who are unfamiliar to photography.

In the lens-fitted photo film unit, a photo film winder wheel is manually rotated each time after taking one exposure. A spool in the cassette shell is caused to rotate in a direction of winding the photo film, to wind the photo film by one frame. The use of the lens-fitted photo film unit is finished when all the photo film is wound into the cassette shell. The lens-fitted photo film unit then forwarded to a photo laboratory.

In the photo laboratory, the lens-fitted photo film unit is oriented upside down for processing. A bottom lid disposed on the bottom of the cassette containing chamber is opened forcibly to open a bottom opening which provides access to the a photo film chamber. Then the orientation of the lens-fitted photo film unit is changed again to direct its bottom downwards. The lens-fitted photo film unit is shaken up and down strongly to eject the photo film cassette from the cassette containing chamber.

There is a lens-fitted photo film unit in which a photo film cassette of the IX 240 type is contained. The IX 240 type includes a resin cassette shell, and incorporates a cassette shutter, disposed in a photo film passageway, and rotatable between an open position for opening the photo film passageway and a closed position for closing the photo film passageway. In the lens-fitted photo film unit, the cassette shutter is rotated to the closed position in response to an opening movement of the bottom lid, preventing ambient light from entering the cassette shell of the photo film removed from the lens-fitted photo film unit after exposure have been made.

However, there is a problem in that the change in orientation of the lens-fitted photo film unit is required in removing the photo film cassette, so that efficiency in the operation decreases. If an operator fails to catch the photo film cassette which ejected upon shaking the lens-fitted photo film unit, the photo film cassette may forcefully strike a hard surface and be damaged.

In the photo film cassette where the cassette shell of resin contains the cassette shutter, shock of drop of the photo film cassette is likely to open the cassette shutter to cause entry of ambient light into the cassette shell, thereby fogging the photo film. Also an outer shape of the cassette shell is likely to be damaged.

SUMMARY OF THE INVENTION

In view of the foregoing problems, an object of the present invention is to provide a lens-fitted photo film unit from which a photo film cassette can be removed safely and easily after taking exposures.

In order to achieve the above and other objects and advantages of this invention, a lens-fitted photo film unit is pre-loaded with unexposed photo film for taking exposures thereon. A photo film roll chamber contains a roll of the unexposed photo film. A cassette containing chamber contains a cassette shell. The photo film is wound into the cassette shell after each exposure. A bottom opening is formed in a bottom of the cassette containing chamber. A bottom lid closes the bottom opening light-tightly, being opened outwards after the photo film is wound into the cassette shell, to remove the cassette shell from the cassette containing chamber. An ejector is moved in response to outward opening movement of the bottom lid, for pushing the cassette shell toward an outside of the bottom opening, to move at least a bottom end face of the cassette shell out of the cassette containing chamber.

In a preferred embodiment, a photo film passageway is formed in the cassette shell and adapted to passage of the photo film there through. A cassette shutter is contained in the photo film passageway, and is rotatable between an open position to open the photo film passageway and a closed position to close the photo film passageway. The cassette shutter, when in the open position, allows the photo film to pass through the photo film passageway, and when in the closed position, keeps ambient light from passing through the photo film passageway.

A rotating member is disposed on a top wall of the cassette containing chamber, engaged with an axial end of the cassette shutter, and rotatable between the open and closed positions of the cassette shutter. A closing spring biases the rotating member toward the closed position of the cassette shutter. The ejector is disposed on a lateral wall of the cassette containing chamber, is slidable up and down, and has top and bottom ends. The bottom end is secured to the bottom lid. The top end is positioned in a rotational path of the rotating member while the photo film is passed through the photo film passageway, for retaining the rotating member in the open position of the cassette shutter against bias of the closing spring. The ejector is slid in response to the outward opening movement of the bottom lid, for releasing the top end from retention of the rotating member, the closing spring allowing the rotating member to rotate to the closed position of the cassette shutter. The ejector comprises an ejector projection, disposed on the ejector to project therefrom near to the top end, in contact with a top end face of the cassette shell, for moving the cassette shell in response to a slide of the ejector.

A first engaging claw is disposed on the bottom end. A second engaging claw is disposed on the bottom lid, for retaining the first engaging claw, to pull the ejector with the first engaging claw in response to a pull of the bottom lid.

There is a through hole formed through the top wall of the cassette containing chamber, for receiving the ejector projection to push the cassette shell.

BRIEF DESCRIPTION OF THE DRAWINGS

The above objects and advantages of the present invention will become more apparent from the following detailed description when read in connection with the accompanying drawings, in which:

FIG. 2 is an exploded perspective illustrating a housing of the lens-fitted photo film unit;

FIG. 4 is an exploded perspective illustrating the lens-fitted photo film unit;

DETAILED DESCRIPTION OF THE PREFERRED EMBODIMENTS OF THE PRESENT INVENTION

A preferred embodiment is hereinafter described, in which there is a photo film cassette incorporating a cassette shutter, disposed in a photo film passageway, and rotatable between an open position for opening the photo film passageway and a closed position for closing the photo film passageway.

Figure 1:
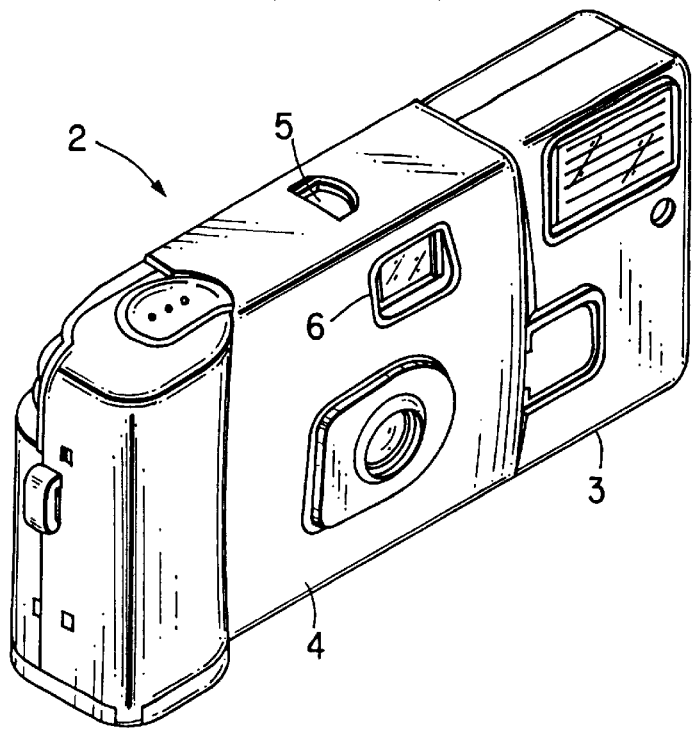
FIG. 1 is a perspective illustrating a lens-fitted photo film unit.

In FIG. 1, a lens-fitted photo film unit 2 is depicted in an ordinary orientation. The lens-fitted photo film unit 2 includes a housing 3 and a sticker 4 or outer sheet member. The housing 3 incorporates a mechanism for taking exposures. The outer sheet member 4 is shaped like a belt, and has a decorative pattern printed outside with information. The whole of a reverse side of the outer sheet member 4 is coated with adhesive agent and attached to the housing 3. There are openings formed in the outer sheet member 4, through which there appear an objective window 5 of a viewfinder, a frame counter window 6, and the like.

In FIG. 2, components of the housing 3 are depicted. The housing 3 is constituted by an exposure unit 7, an electronic flash unit 9, a photo film cassette 13, a photo film containing unit 16, a front cover 17 and a rear cover 20. The exposure unit 7 includes a shutter mechanism and a one-frame winder mechanism. The flash unit 9 contains a battery 8 for a flash device. The photo film cassette 13 includes a cassette shell 11 formed from resin by injection molding and a photo film 12 drawn from the cassette shell 11 and externally wound in a roll form. The photo film containing unit 16 has a cassette containing chamber 14 and a photo film roll chamber 15. The front cover 17 is fitted on a front face of the photo film containing unit 16 after mounting the exposure unit 7 and the flash unit 9 thereon. The rear cover 20 is fitted on a rear face of the photo film containing unit 16 after inserting the cassette shell 11 and the photo film 12 respectively into the cassette containing chamber 14 and the photo film roll chamber 15. The rear cover 20 includes bottom lids 18 and 19 and a battery cover portion 22. The bottom lid 18 closes a bottom opening 24 of the cassette containing chamber 14. The bottom lid 19 closes a bottom opening of the photo film roll chamber 15. The bottom of the photo film containing unit 16 is covered by those portions of the rear cover 20.

Figure 3:
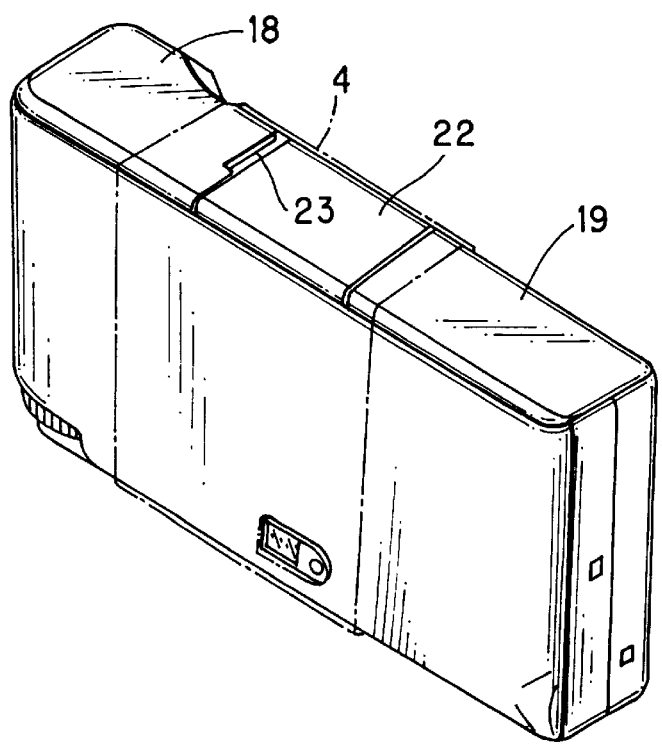
FIG. 3 is a perspective illustrating the lens-fitted photo film unit oriented upside down.

In FIG. 3, the lens-fitted photo film unit 2 is depicted in an upside down orientation. There is a gap 23 defined between the bottom lid 18 and the battery cover portion 22, which is located between the bottom lids 18 and 19. To remove the photo film cassette 13, a tool is inserted into the gap 23 and between the bottom lid 18 and the photo film containing unit 16, and forcibly opens the bottom lid 18, so that the bottom opening 24 appears under the cassette containing chamber 14 as illustrated in FIG. 4.

In FIG. 4, components of the lens-fitted photo film unit are depicted. The photo film cassette 13 includes the cassette shell 11, a spool 25 and a cassette shutter 28. The cassette shell 11 is constituted by a pair of resin shell halves The spool 25 is contained between the shell halves. in a rotatable manner. The cassette shutter 28 is rotatable between an open position to open a photo film passageway 26 and a closed position to close the photo film passageway 26. There is a winder wheel 27 disposed on the top wall of the cassette containing chamber 14 in a rotatable manner. An axial projection 27a of the winder wheel 27 is engaged with an axial end of the spool 25. The photo film 12 is wound into the cassette shell 11 when the winder wheel 27 is externally rotated.

On the outside of a top wall of the cassette containing chamber 14 are disposed a rotating member 30 and a closing spring 31. The rotating member 30 is engaged with an axial end of the cassette shutter 28 and is rotatable between the open and closed positions of the cassette shutter 28. The closing spring 31 rotationally biases the rotating member 30 toward the closed position of the cassette shutter 28. An ejector member 32 includes a top end 32a and a bottom end 32b. The ejector member 32 also operates as a transmission member. The top end 32a retains the rotating member 30 in the open position of the cassette shutter 28 against the bias of the closing spring 31. The bottom end 32b is engageable with an engaging claw 35, which is formed on the bottom lid 18. The ejector member 32 is supported in a vertically slidable manner in contact with the outside of a front wall of the cassette containing chamber 14. The ejector member 32 is supported between the side wall of the cassette containing chamber 14 and a guide wall 36 and kept from dropping by rails 33. When the bottom lid 18 is opened and moved downwards, the ejector member 32 is slid down, and releases the rotating member 30 from being retained at the top end 32a. The rotating member 30 rotates in a direction of closing the cassette shutter 28. The cassette shutter 28 comes to the closed position to close the photo film passageway 26.

Figure 5A:
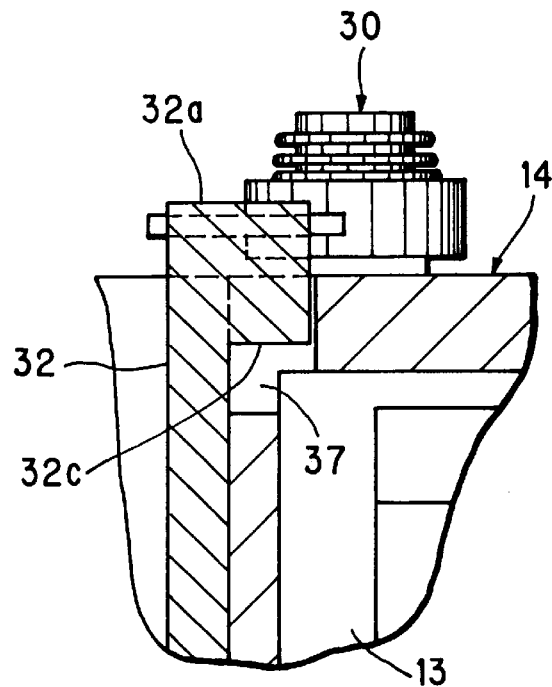
FIG. 5A is an explanatory view illustrating a state where an ejector member retains the rotating member and before its ejector projection pushes a photo film cassette.
Figure 5B:
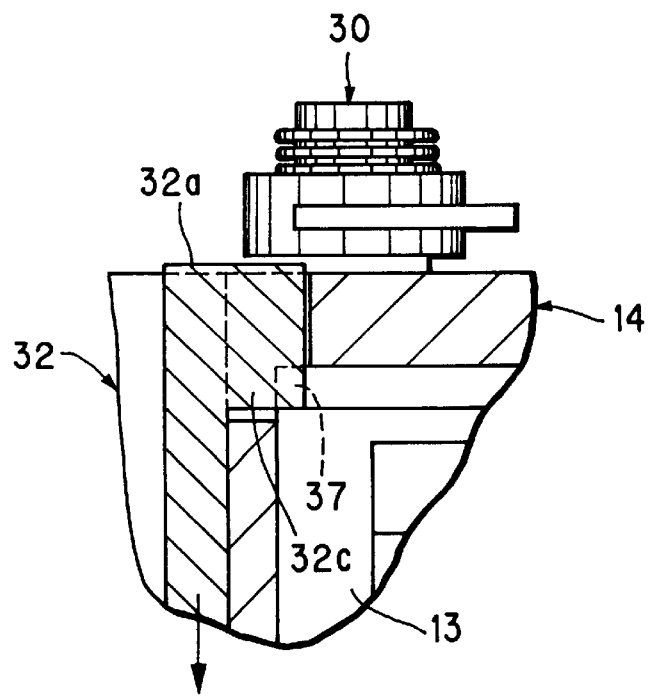
FIG. 5B is an explanatory view illustrating a state where the ejector projection pushes the photo film cassette.

The top end 32a of the ejector member 32 includes an ejector projection 32c, which is shifted in response to an opening movement of the bottom lid 18 for exiting a bottom of the photo film cassette 13 from the cassette containing chamber 14. The ejector projection 32c, when the ejector member 32 is initially mounted on the outside of the cassette containing chamber 14, is inserted in a slot or through hole 37 formed in the top wall of the cassette containing chamber 14, comes to the inside of the cassette containing chamber 14, and is confronted with the top of the photo film cassette 13. See FIG. 5A. When the ejector member 32 is slid down, the ejector projection 32c pushes the top of the photo film cassette 13 to cause the bottom of the photo film cassette 13 to advance out of the bottom opening 24. See FIG. 5B.

Between the bottom of the ejector projection 32c and the top of the photo film cassette 13, there is such a sufficient space that the ejector projection 32c comes in contact with the photo film cassette 13 after the top end 32a retreats from the rotating member 30 to allow moving the cassette shutter 28 with the rotating member 30 to the closed position. The through hole 37 may be sized so that it is blocked by mounting the ejector member 32 thereon. Note that it is of course possible to attach light-shielding fabric to the periphery of the through hole 37 or finish the periphery of the through hole 37 with a matte finish for the purpose of heightening light-shielding performance.

The operation of removing the cassette from the lens-fitted photo film unit will now be described. At first the lens-fitted photo film unit 2 is oriented upside down. A disengaging tool is inserted into the gap 23 forcibly open the bottom lid 18. In response to this, the ejector member 32 is slid in a direction toward the bottom of the lens-fitted photo film unit 2, and releases the rotating member 30 from being retained. The rotating member 30 causes the cassette shutter 28 to rotate into the closed position to close the photo film passageway 26. The bottom lid 18 is further moved in the opening direction. With the ejector member 32 slid further, the ejector projection 32c contacts the top of the photo film cassette 13, and advances the bottom of the photo film cassette 13 out of the bottom opening 24. As the bottom is oriented upwards, the photo film cassette 13 exits in the upward direction. Thus it is possible to remove the photo film cassette 13 easily even in the orientation upside down of the lens-fitted photo film unit, because an operator can pick up the bottom of the photo film cassette 13 manually after the ejector operates.

In the present embodiment, the ejector projection 32c contacts and pushes the top end face of the photo film cassette 13. Alternatively other portions of the photo film cassette 13 different from its top end face may be pushed by an ejector mechanism. For example, a peripheral face of the photo film cassette 13 may have a recess, a hole or other stepped portions, which may be engageable with the ejector to push out the photo film cassette 13.

In the present embodiment, the ejector projection is formed integrally with the transmission portion of the ejector. Of course an ejector may be formed as a separate piece from a transmission portion for association of opening movement of the bottom lid with closing of the cassette shutter.

In the present embodiment, the ejector member is disposed outside the cassette containing chamber 14. Alternatively the ejector member may be disposed inside the cassette containing chamber 14.

In the present embodiment, the photo film cassette is an IX 240 type including the rotatable cassette shutter. Alternatively a lens-fitted photo film unit of the present invention may contain a photo film cassette of the 135 type. The ejector may only be associated with opening movement of the bottom lid. It is possible with the 135 type to remove the cassette of which a small portion of a leading end of the exposed photo film protrudes outside the cassette shell.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit preloaded with unexposed photo film, including a photo film roll chamber containing a roll of said unexposed photo film, and a cassette containing chamber containing a cassette shell, said photo film being adapted to be wound into said cassette shell after being exposed, said lens-fitted photo film unit comprising:
   a bottom opening disposed in a bottom of said cassette containing chamber;
   a bottom lid capable of closing said bottom opening in a light-tight fashion, said bottom lid being openable outwards to allow removal of said cassette shell from said cassette containing chamber through said bottom opening after said photo film is wound into said cassette shell; and
   an ejector connected at a bottom end thereof to said bottom lid so that the elector is pulled by the bottom lid when the bottom lid is opened, a top end of the elector being structured and arranged to push said cassette shell toward an outside of said bottom opening as the ejector is pulled by the bottom lid, to move at least one end face of said cassette shell out of said cassette containing chamber.

2. A lens-fitted photo film unit as defined in claim 1, further comprising:
   a photo film passageway formed in said cassette shell and adapted to passage of said photo film therethrough; and
   a cassette shutter, contained in said photo film passageway, rotatable between an open position and a closed position in which said photo film passageway is closed in a light-tight fashion, said cassette shutter, when in said open position, allowing said photo film to pass through said photo film passageway, and when in said closed position, keeping ambient light from entry into said cassette shell.

3. A lens-fitted photo film unit as defined in claim 2, further comprising:
   a rotating member, disposed on a top wall of said cassette containing chamber, engaged with an axial end of said cassette shutter, rotatable between first and second positions, for rotating said cassette shutter between said closed and open positions, respectively; and
   a closing spring for biasing said rotating member toward said first position.

4. A lens-fitted photo film unit as defined in claim 3, wherein said ejector is disposed on a lateral wall of said cassette containing chamber, is slidable up and down, and includes an ejector projection on the top end;
   said ejector being adapted to slide in response to opening movement of said bottom lid, said bottom end being disconnectable from said bottom lid during said opening movement of said bottom lid;
   said top end retaining said rotating member in said second position when said bottom lid is closed, and releasing said rotating member from retention when slid in response to said opening movement of said bottom lid; and
   said ejector projection being engaged with a top end face of said cassette shell, and pushing said top end face when slid, so as to move said cassette shell outwards from said cassette containing chamber.

5. A lens-fitted photo film unit as defined in claim 4, further comprising:
   a first engaging claw disposed on said bottom end; and
   a second engaging claw disposed on said bottom lid, engaged with said first engaging claw for connecting said bottom end to said bottom lid.

6. A lens-fitted photo film unit as defined in claim 5, further comprising a through hole, disposed in said top wall of said cassette containing chamber, for receiving said ejector projection to push said cassette shell.

7. A lens-fitted photo film unit preloaded with unexposed photo film, including a photo film roll chamber containing a roll of said unexposed photo film, a cassette containing chamber containing a cassette shell, said photo film being adapted to be wound into said cassette shell after being exposed, a photo film passageway formed in said cassette shell and adapted to passage of said photo film therethrough, a cassette shutter, contained in said photo film passageway, rotatable between an open position and a closed position in which said photo film passageway is closed in a light-tight fashion, said cassette shutter, when in said open position, allowing said photo film to pass through said photo film passageway, and when in said closed position, keeping ambient light from entry into said cassette shell, said lens-fitted photo film unit comprising:

a bottom opening disposed in a bottom of said cassette containing chamber;

a bottom lid capable of closing said bottom opening in a light-tight fashion, said bottom lid being openable outwards to allow removal of said cassette shell from said cassette containing chamber through said bottom opening after said photo film is wound into said cassette shell;

a rotating member, disposed on a top wall of said cassette containing chamber, engaged with an axial end of said cassette shutter, rotatable between first and second positions, for rotating said cassette shutter between said closed and open positions, respectively;

a closing spring for biasing said rotating member toward said first position; and an ejector, disposed on a lateral wall of said cassette containing chamber, slidable up and down, having a bottom end, a top end and an ejector projection, wherein said bottom end is connected to said bottom lid so that the elector slides in response to opening of said bottom lid, said bottom end being disconnectable from said bottom lid during said opening movement of said bottom lid, wherein said top end retains said rotating member in said second position when said bottom lid is closed, and releases said rotating member from retention when slid in response to said opening movement of said bottom lid, and wherein said ejector projection is engaged with a top end face of said cassette shell, and pushes said top end face when slid, so as to move said cassette shell outwards from said cassette containing chamber.

* * * * *